US008300077B2

(12) United States Patent
 Dunko

(10) Patent No.: US 8,300,077 B2
(45) Date of Patent: Oct. 30, 2012

(54) ENHANCED VIDEO TELEPHONY THROUGH AUGMENTED REALITY

(75) Inventor: Gregory A. Dunko, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 1265 days.

(21) Appl. No.: 12/048,269

(22) Filed: Mar. 14, 2008

(65) Prior Publication Data

US 2009/0231413 A1   Sep. 17, 2009

(51) Int. Cl.
*H04N 7/14* (2006.01)
(52) U.S. Cl. .................. 348/14.02; 348/14.01
(58) Field of Classification Search .... 348/14.01–14.04, 348/14.05–14.16, E7.001, E7.077, E7.083; 379/201.01, 202.01; 725/25, 37, 105, 109, 725/110
See application file for complete search history.

(56) References Cited

U.S. PATENT DOCUMENTS

| 6,243,129 B1 | 6/2001 | Deierling | |
| 2007/0195158 A1* | 8/2007 | Kies | 348/14.01 |

FOREIGN PATENT DOCUMENTS

| WO | 99/30495 | 6/1999 |
| WO | 99/57900 | 11/1999 |

OTHER PUBLICATIONS

International Search Report, corresponding to International Patent Application No. PCT/US2008/077180, dated Dec. 3, 2008.
Written Opinion, corresponding to International Patent Application No. PCT/US2008/077180, dated Dec. 3, 2008.
International Preliminary Report on Patentability, corresponding to International Patent Application No. PCT/US2008/077180, dated Mar. 22, 2010.

* cited by examiner

*Primary Examiner* — Brian Ensey
(74) *Attorney, Agent, or Firm* — Patrick B. Horne; Moore & Van Allen PLLC

(57) ABSTRACT

A method for enhancing video telephony that includes initiating a video telephone call from a first device to a second device, displaying a live video view by the first device, transferring video from the second device to the first device during the video telephone call, and overlaying the transferred video over the live video view displayed at the first device. The first device and the second device may be mobile devices. A portion of the transferred video may be selected and the selected portion displayed over the displayed live video view at the first device. The transferred video may be video taken from a camera on the second device. The transferred video may also be displayed over the live video view on a third device attached to the first device.

19 Claims, 8 Drawing Sheets

ENHANCED VIDEO TELEPHONY THROUGH AUGMENTED REALITY

BACKGROUND OF THE INVENTION

The present invention is related to video telephony, and more specifically to enhanced video telephony through augmented reality.

Currently, video telephony is an under-utilized application. During video telephony, real time multimedia such as video may be transferred between devices during a telephone call. Once a connection is established between a first device and a second device, the two devices can send multimedia between each other while simultaneously conducting a telephone conversation. Currently, it is common that each device merely transfers a video or picture of the holder of one device to the other device. A user of a device has no way to enhance the video received from the other user's device.

BRIEF SUMMARY OF THE INVENTION

According to one aspect of the present invention, a method for enhancing video telephony that includes initiating a video telephone call from a first device to a second device, displaying a live video view by the first device, transferring media from the second device to the first device during the video telephone call, and overlaying the transferred media over the live video view displayed at the first device.

According to another aspect of the present invention, a device for enhancing video telephony includes a video capture device, the video capture device being capable of capturing a live video view, a video telephony module, the video telephony module being capable of receiving transferred media during a video telephone call, a processor, the processor being capable of overlaying the transferred media over the live video view, and a display, the display capable of displaying the transferred media overlaid over the live video view.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
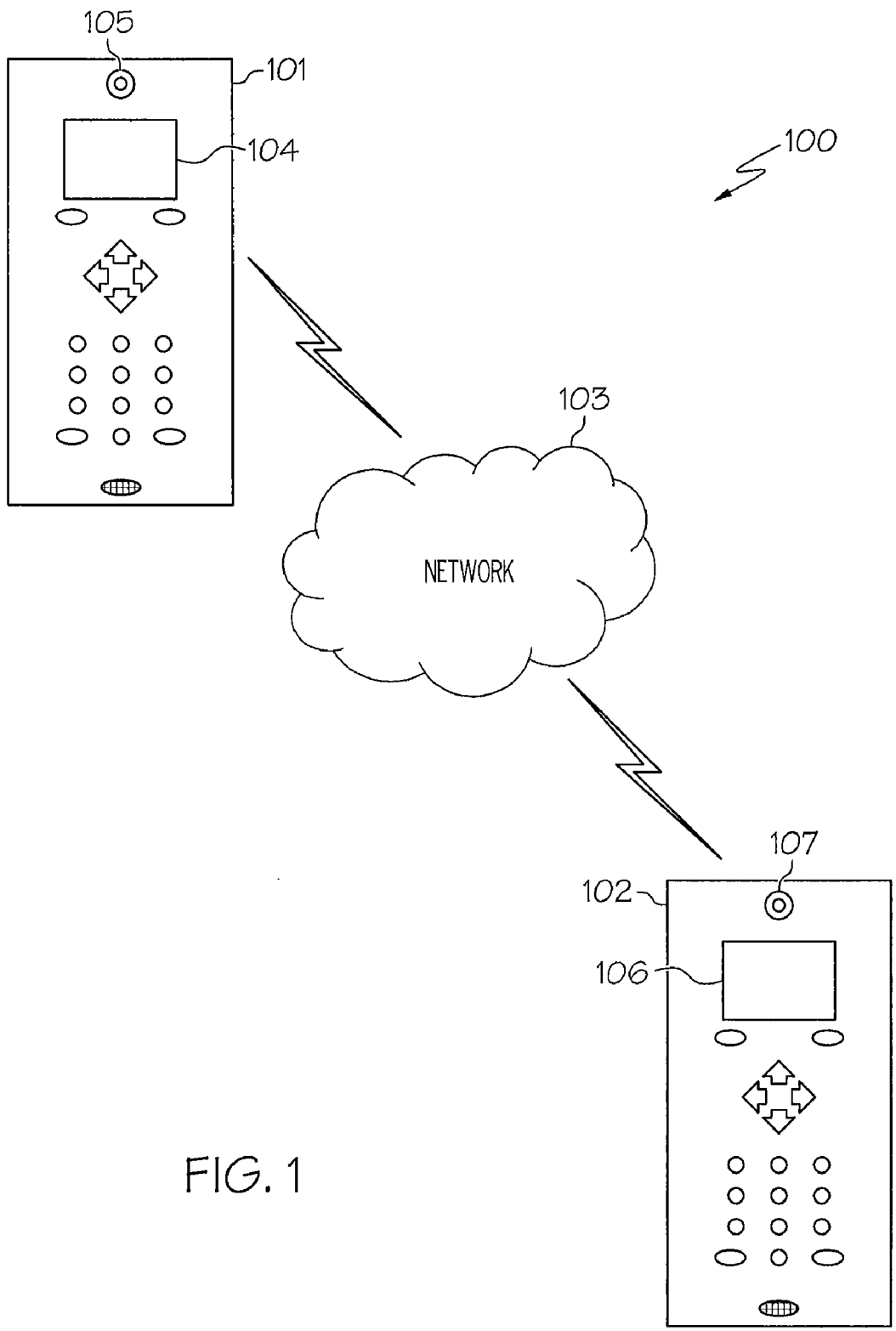
FIG. 1 is a system for enhancing video telephony according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the present invention.

According to embodiments of the present invention, a video telephony experience is enhanced through the use of augmented reality. A user holding a device capable of a video telephony communication, may use the device to generate augmented reality using multimedia content received from a second device by overlaying or floating the received content over live video content being displayed at the receiving device. For example, if the received multimedia content is a picture of the other party, the received picture may be displayed at the receiving device overlaid or floating on a live video view being displayed at the receiving device. Further the received picture may be displayed at the receiving device overlaid or floating on a stored image, object, etc. placed in the live video view at the receiving device. In addition, a portion of the received media may be selected and stripped off and used to overlay or float above the live video view. Therefore, a telephone conversation takes on a different feel than normal video telephony. To illustrate the present invention, the terms multimedia and media will be used interchangeably to present content in the form of a video, a picture, a graphic, audio, an image, a background, a scene, or any combination thereof.

Moreover, according to embodiments of the present invention, a third device may be attached to the receiving device and may display the received media overlaid or floating over a live video view. The third device may be any type of device that is capable of displaying media such as, for example, a display, goggles, a computer, an augmented reality headset, etc. In this embodiment, a device may receive media such as video, audio, pictures, etc. from another device and transfer the received media to the third device. The third device may then overlay the received media or float the received media onto a live video feed at the third device. For example, if the third device is goggles, a user wearing the goggles may be viewing something through the goggles and may overlay the received media onto the live view being watched using the goggles. In embodiments according to the present invention using goggles, the media being overlaid or projected may be virtual and may be projected wherever a person wearing the goggles is looking.

When media is referred to as floated over a live video view, this may imply that the received media is floated over the live video view being displayed at the receiving device and is not attached to any object or image in the live video view. When media is referred to as being overlaid over a live video view, this may imply that the received media may be overlaid on a live video view and may be attached or associated with an object or other item in the live video view. For example, if the media received is a head shot of the other party, this media may be overlaid onto an existing body or other object in the live video view thereby enhancing the video telephony experience.

The overlaid video or media may need to be dynamic if the object (e.g., body) being overlaid is moving. One or more software routines may be used to assess the real world (i.e., live) environment being viewed and determine which portion of the view to overlay or float the received media onto. Moreover, a user may use a user interface to select where the media is floated or overlaid in the live video view. The software may determine a "best match" for placing the received media based on other inputs such as a size or shape of an object, a body type, a position, etc. in the live video view.

Media may be transferred between the two devices over any type of network capable of transferring multimedia such as video, audio, images, graphics, etc., between two devices while simultaneously conducting a telephone call between the two devices. The network may be, for example, a video telephony network. However, embodiments according to the present invention are not limited to use of a video telephony network as any network capable of transferring multimedia content while simultaneously conducting a telephone call is within the scope of the present invention. Further, the device receiving the media may include a storage device for storing content such as, for example, canned images, video, graphics, objects, backgrounds, scenes, etc. The stored content may be retrieved and used in a display where the received media may be floated or overlaid over some or all of the displayed stored content. The device receiving the media may include a processor and software capable of rendering an additional layer of processing for overlaying or floating the received media (e.g., video, image, picture, background, etc.) over a live video view at the device.

FIG. 1 shows a system for enhancing video telephony according to an example embodiment of the present invention. The system 100 may include a first device 101 and second device 102 that may transfer multimedia such as, for example, video, images, graphics, audio, or a combination thereof, over a network 103. The network 103 may be any type of network capable of transferring video telephony. The first device 101 may include a video capture device 105 and display 104. The video capture device 105 may be a video camera and may be used to capture media for transmitting over the network 103 to the second device 102. Similarly, the second device 102 may include a video capture device 107 and a display 106. The video capture device 107 may capture a live video view for display on the display device 106. Multimedia received at the second device 102 from the first device 101 may be floated or overlaid over the live video view displayed on the display 106. In this example embodiment, the first device 101 and the second device 102 may be mobile devices such as, for example, mobile phones.

Figure 2:
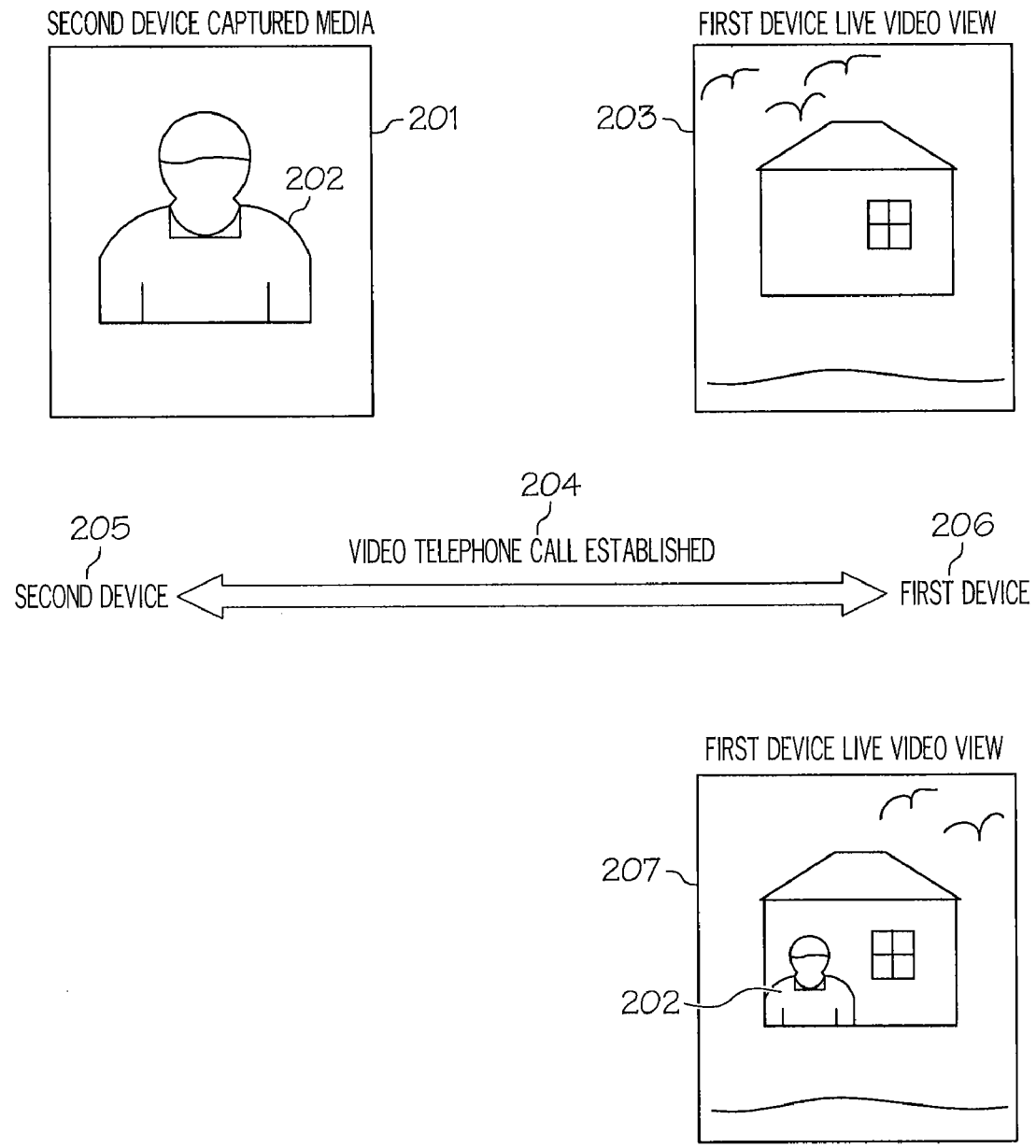
FIG. 2 is a diagram illustrating overlaying media on a live video view according to an example embodiment of the present invention.

FIG. 2 shows a diagram illustrating overlaying media on a live video view according to an example embodiment of the present invention. A display device 201 at a second device 205 may display captured media 202. In this example embodiment, the captured media may be a picture of a holder of the second device 205. A display 203 at a first device 206 may display a live video view (i.e., real-time view). The second device 205 may establish a video telephone call 204 with the first device 206 and may transfer the captured media 202 from the second device 205 to the first device 206. The first device 206 may then display a live video view 207 with the received media 202 overlaid (or floating) over the live video view.

Figure 3:
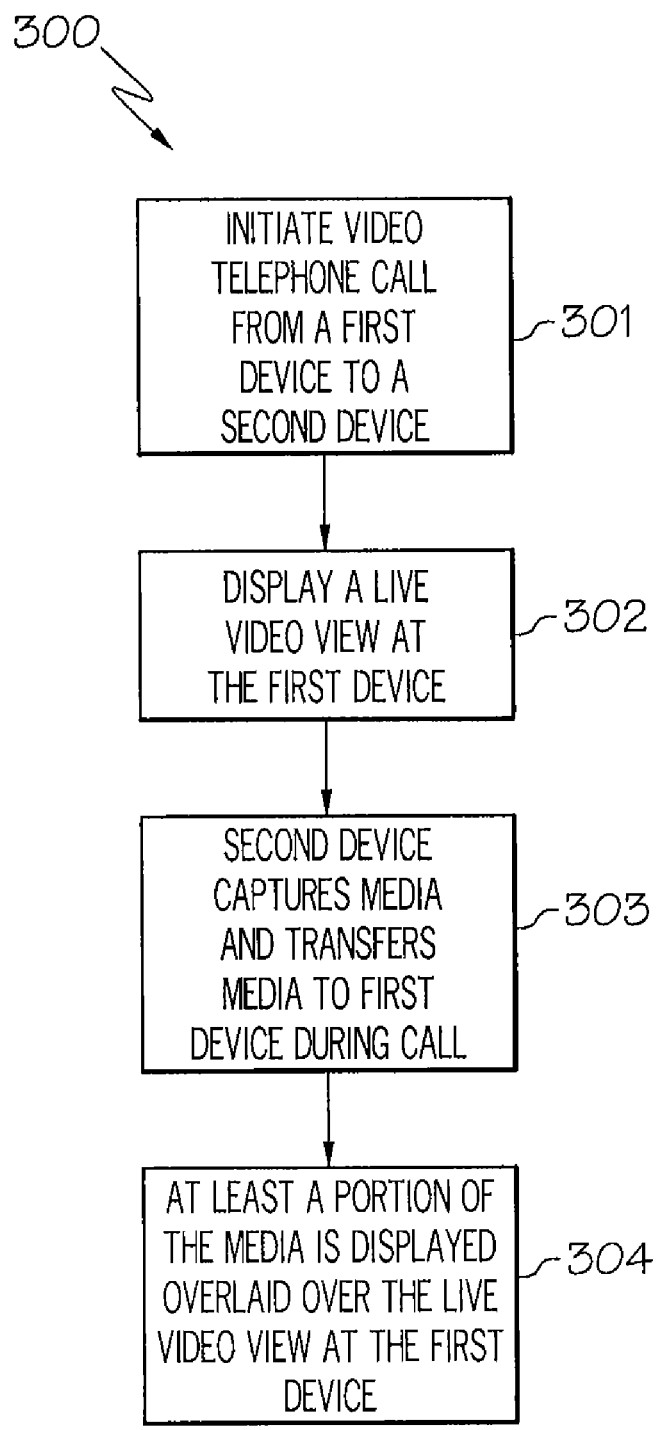
FIG. 3 is a flowchart of a process for enhancing video telephony according to an example embodiment of the present invention.

FIG. 3 shows a flowchart of a process for enhancing video telephony according to an example embodiment of the present invention. In the process 300 in block 301, a video telephone call may be established between a first device and a second device. In block 302, a live video view may be displayed at the first device. In block 303, the second device may capture media and transfer the media to the first device during the telephone call. In block 304, at least a portion of the media may be displayed overlaid (or floating) over the live video view at the first device.

Figure 4:
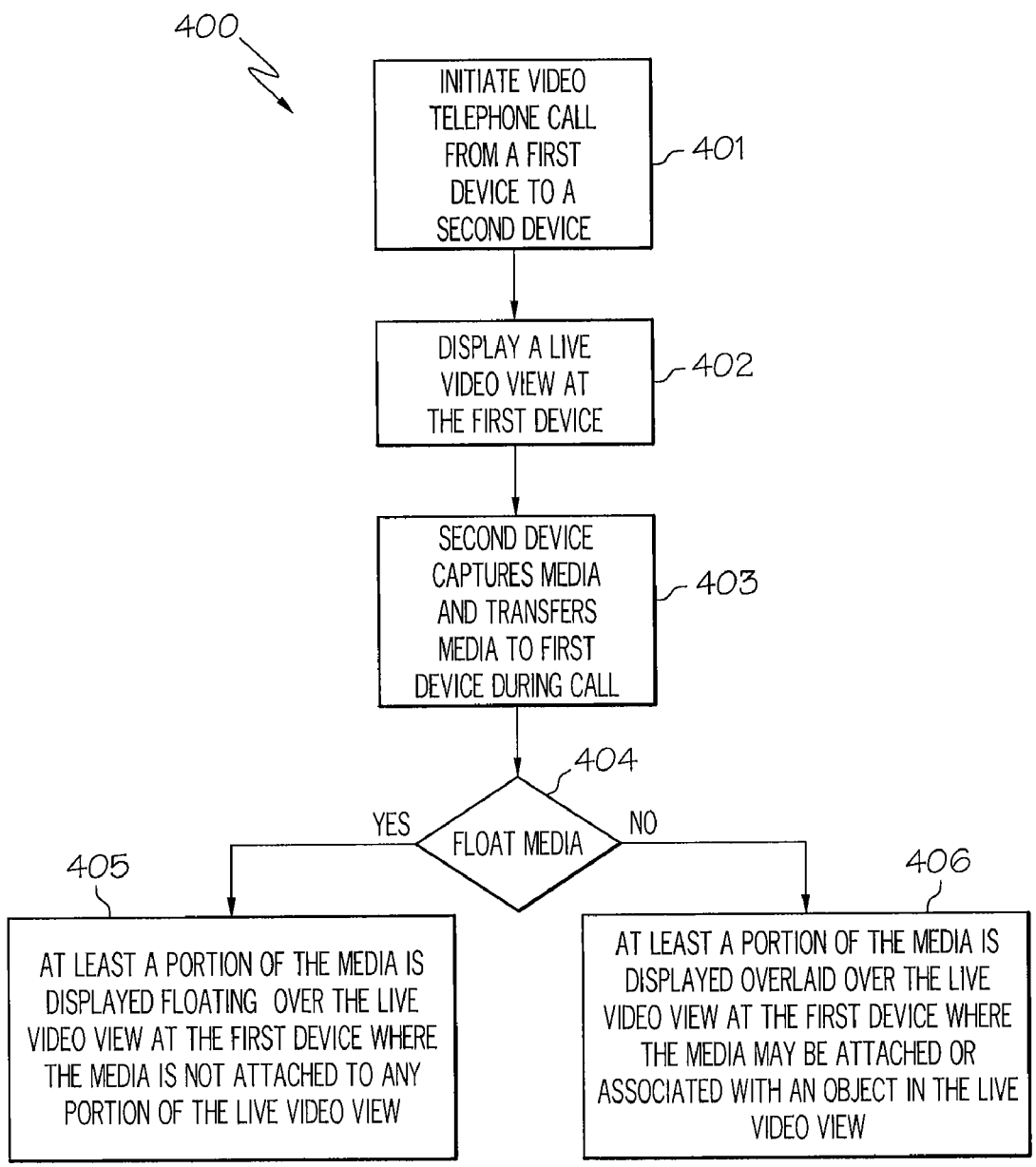
FIG. 4 is a flowchart of a process for enhancing video telephony according to another example embodiment of the present invention.

FIG. 4 shows a flowchart of a process for enhancing video telephony according to another example embodiment of the present invention. In the process 400 in block 401, a video telephone call may be established between a first device and a second device. In block 402, a live video view may be displayed at the first device. In block 403, a second device may capture media and transfer the media to the first device during a telephone call. In block 404, it may be determined whether it is desired to float the media over the live video view and if so, in block 405, at least a portion of the media may be displayed floating over the live video view at the first device, where the media is not attached to any portion of the live video view. If it is desired not to float the media, then in block 406, at least a portion of the media may be displayed overlaid over the live video view at the first device where the media may be attached or associated with an object in the live video view.

Figure 5:
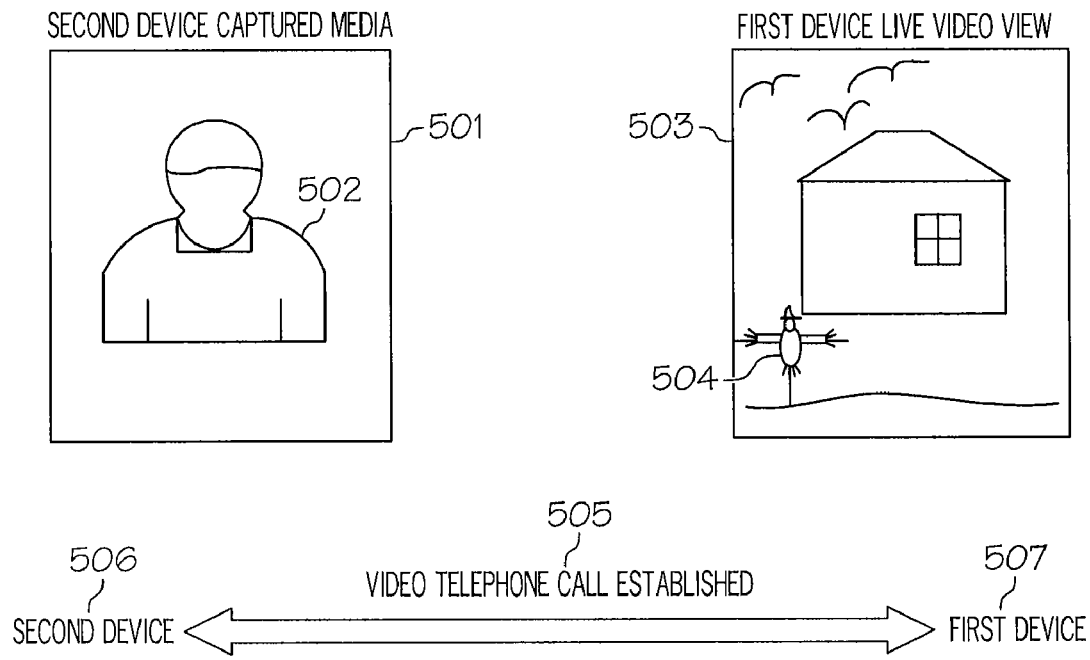
FIG. 5 is a diagram illustrating overlaying captured media over a live video view according to still another example embodiment of the present invention.
Figure 5:
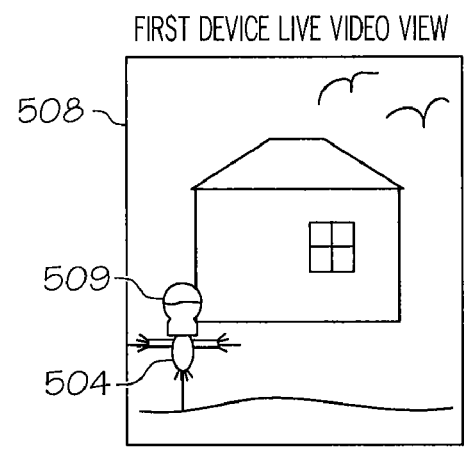

FIG. 5 shows a diagram illustrating overlaying captured media over a live video view according to still another example embodiment of the present invention. A display 501 at a second device 506 may display captured media 502. In this example embodiment, the captured media 502 may be a picture of the holder of the second device 506. Concurrently, a first device 507 may display a live video view 503 that may include an image 504 placed in the live video view 503 that is not a part of the original live video view. The second device 506 may establish a video telephone call 505 with the first device 507 and transfer the captured media 502 from the second device 506 to the first device 507. In this example embodiment, a live video view 508 at the first device 507 may display a portion of 509 of the captured media 502 overlaid over the object 504. The portion 509, in this example, is only a head portion 509 of the captured media 502 that has been stripped from the captured media 502 and displayed in the live video view 508 placed on the object 504, which in this example embodiment is a scarecrow.

Figure 6:
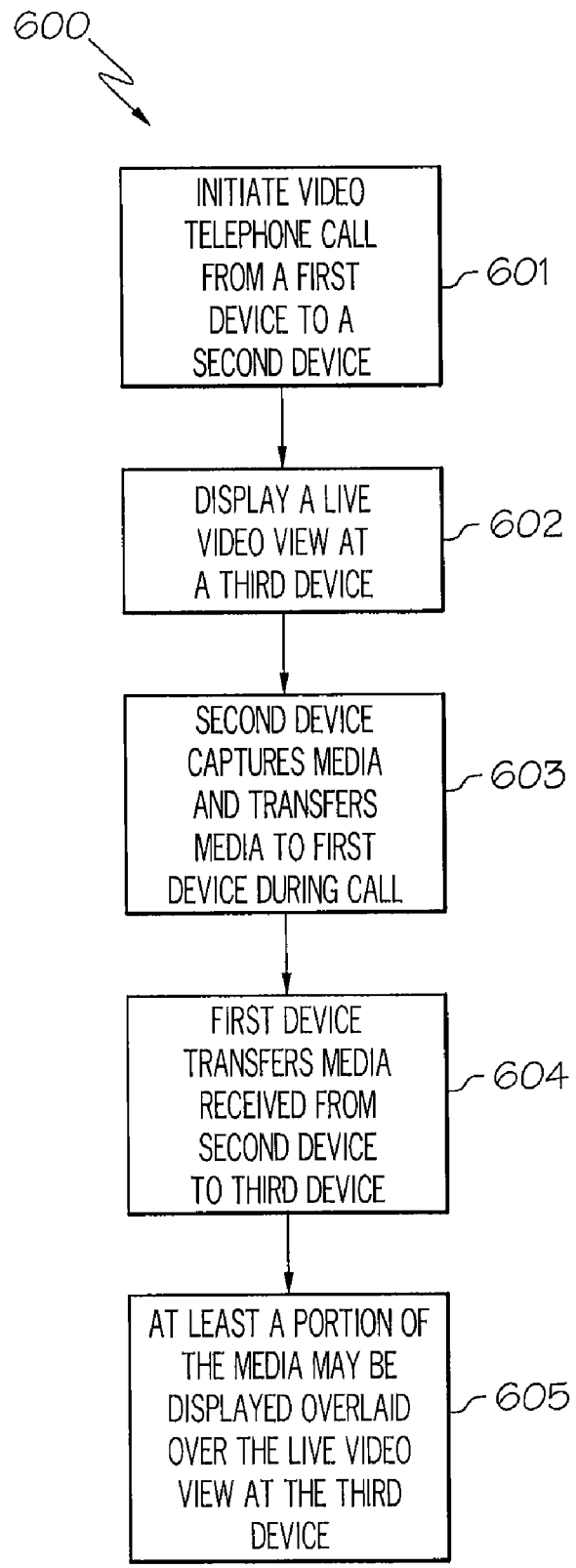
FIG. 6 is a flowchart of a process for enhancing video telephony according to a still further example embodiment of the present invention.

FIG. 6 shows a flowchart of a process for enhancing video telephony according to a still further example embodiment of the present invention. In the process 600 in block 601, a video telephone call may be established between a first device and a second device. In block 602, a live video view may be displayed at a third device. In block 603, the second device may have captured media and transfers the media to the first device during the video telephone call. In block 604, the first device transfers the media received from the second device to the third device. In block 605, at least a portion of the media may be displayed overlaid over the live video view at the third device. Further, the portion of the media may be displayed floating over the live video view at the third device. A user of the third device may determine whether the portion of the media is floated or overlaid over the live video view. The third device may be any type of device capable displaying a live video view with overlaid or floating media such as, for example, a display, a computer, goggles, an augmented reality headset, etc. The media may be a video, picture, image, object, etc.

Figure 7:
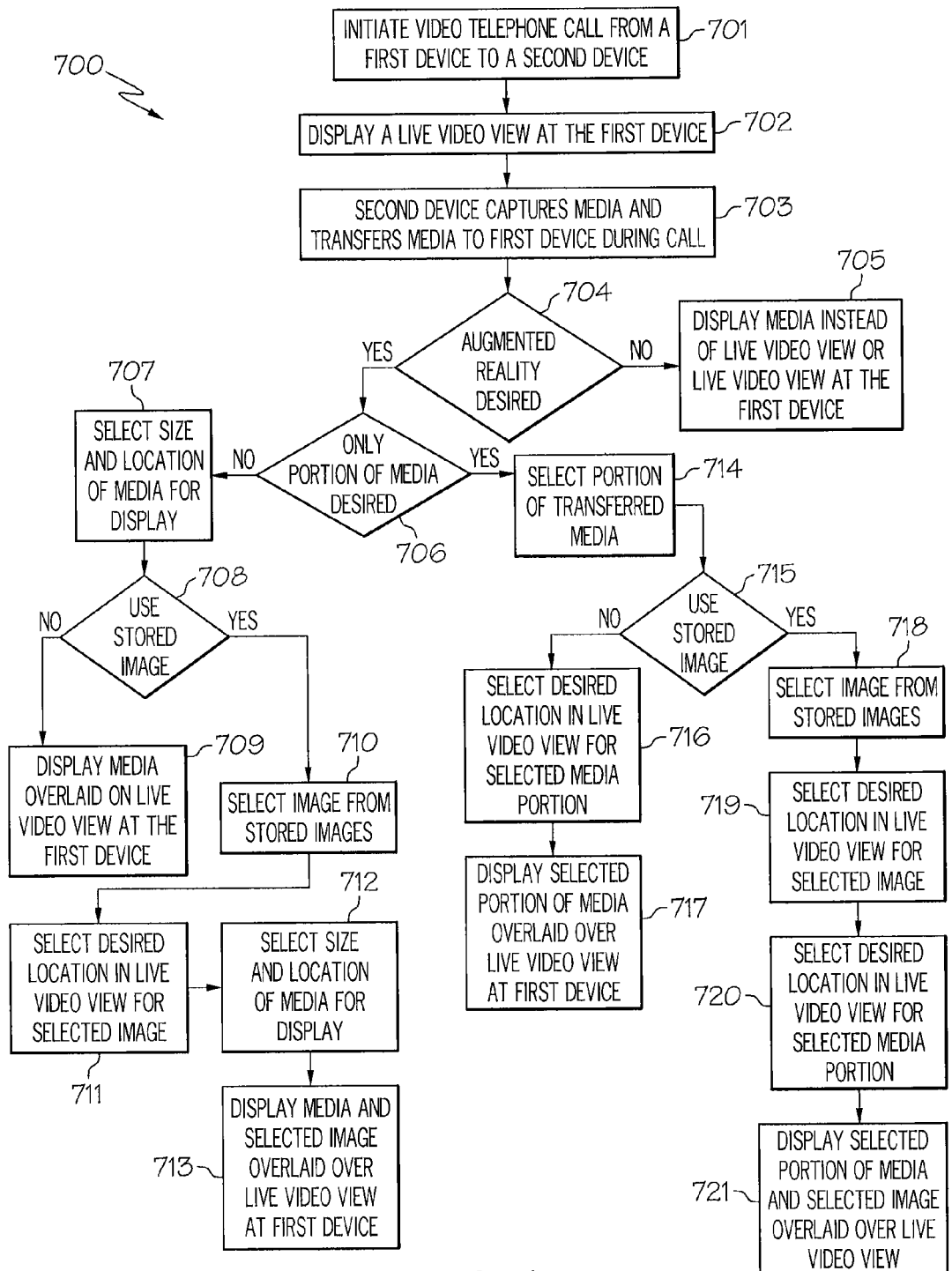
FIG. 7 is a flowchart of a process for enhancing video telephony according to another example embodiment of the present invention.

FIG. 7 shows a flowchart of a process for enhancing video telephony according to another example embodiment of the present invention. In the process 700 in block 701, a video telephone call may be established between a first device and a second device. In block 702, a live video view may be displayed at the first device. In block 703, the second device may capture media and transfer the media to the first device during a video telephone call. In block 704, it may be determined whether augmented reality is desired at the first device and if not, in block 705, the media may be displayed or the live video view may be displayed at the first device. If augmented reality is desired, then in block 706, it may be determined if only a portion of the media is desired to be used. If not, then in block 707, a size and location of the media may be selected for display. For example, the media may be reduced to a specific size (or enlarged) and a location over a live video view for placing the media may be selected. Then, in block 708, it may be determined whether stored content is to be used and if not then block 709 the media may be displayed, overlaid or floating, on the live video view at the first device. If stored content is to be used then in block 710, stored content (e.g., an image, a graphic, a picture, a video, a background, etc.) may be selected from stored content. Then in block 711, a desired location in the live video view for the selected image may be selected. In block 712, a size and location of the media may be selected for display. Then, in block 713, the media and the selected image may be displayed, overlaid (or floating) over the live video view at the first device.

If only a portion of the media is desired, then in block 714, a portion of the transferred media is selected. In block 715, it may be determined whether stored content is to be used and if not then in block 716, a desired location in the live video view will be selected for placement of the selected media portion. Then in block 717, the selected portion of the media may be displayed, overlaid (or floating) over the live video view at the first device. If in block 715, it is desired to use stored content (e.g., an image, a graphic, a picture, a video, a background, etc.), then in block 718, content may be selected from stored content. In block 719, a desired location in the live video view may be selected for the placement of the selected image. In block 720, a desired location in the live video view may be selected for placement of the selected media portion. Then in block 721, the selected portion of media and the selected image may be displayed, overlaid (or floating) over the live video view.

Figure 8:
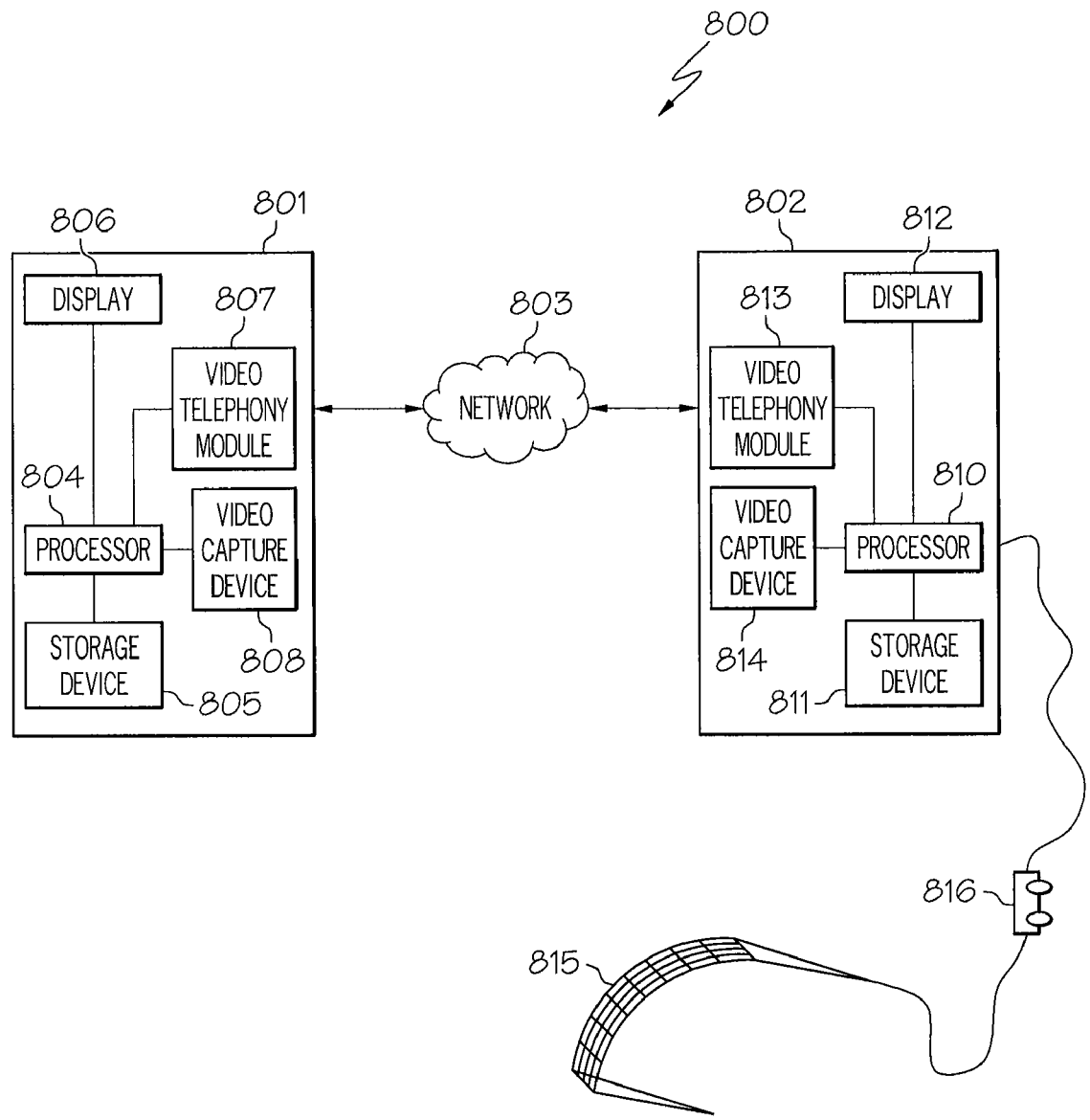
FIG. 8 is a system for enhancing video telephony according to an example embodiment of the present invention.

FIG. 8 shows a system for enhancing video telephony according to an example embodiment of the present invention. The system 800 may include a first device 801 and a second device 802 where media such as video, pictures, audio, graphics, etc., may be transferred between the first device 801 and the second device 802 via a network 803. The network 803 may be any type network capable of supporting video telephony communication between devices. The first device 801 may include a processor 804 that may be connected to a storage device 805, a display 806, a video telephony module 807 and a video capture device 808. The video telephony module 807 may interface with the network 803 for sending and/or receiving media during a telephone call. The video capture device 808 may be capable of capturing media such as video, images, live views, etc. The processor 804 may execute software for performing enhanced processing and allowing overlaying or floating of media over a live video view. The processor 804 may also be capable of performing processing such as resizing and placing received media in a live video view as well as stripping off only desired portions of received media, and adding stored content (e.g., images, graphics, pictures, etc.), stored in the storage device 805 to the live video view. The live video view, the received media, and/or the stored content may be displayed on the display 808.

Similarly, device 802 may include a processor 810 that may be connected to a storage device 811, a display 812, a video telephony module 813, and a video capture device 814. The video telephony module 813 may interface with the network 803 for sending and/or receiving media during a telephone call. The video capture device 814 may be capable of capturing media such as video, images, live views, etc. The processor 810 may execute software for performing enhanced processing and allowing overlaying or floating of media over a live video view. The processor 810 may also be capable of performing processing such as resizing and placing received media in a live video view as well as stripping off only desired portions of received media, and adding stored content (e.g., images, graphics, pictures, etc.), stored in the storage device 811 to the live video view. The live video view, the received media, and/or the stored content may be displayed on the display 812.

A third device 815 may also be attached to the second device 802 where the second device may transfer received media to the third device 815 for display on the third device 815 overlaid or floating over a live video view being looked at by the third device 815. A control device 816 attached to the third device 815 may be used to select location, size, etc., for the received media and perform other types of controls for displaying the received media over the live video view. The control device 816 or the functions of control device 816 may also be a part of or included in device 802.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for enhancing video telephony comprising:
   initiating a video telephone call from a first device to a second device;
   capturing a live video view by the first device;
   transferring media from the second device to the first device during the video telephone call;
   transferring the live video view from the first device to a third device during the video telephone call;
   transferring the media from the first device to the third device during the video telephone call;
   receiving user input by a control device in communication with the third device, the user input indicating the location and size of the media overlaid over the live video view; and
   presenting the transferred media over the live video view displayed at the third device.

2. The method according to claim 1, wherein the first device and the second device comprise mobile devices.

3. The method according to claim 1, further comprising selecting a portion of the transferred media and displaying the selected portion over the displayed live video view at the first device.

4. The method according to claim 1, the transferred media comprising video taken from a camera on the second device.

5. The method according to claim 1, the third device further comprising one of goggles, a display, or an augmented reality headset.

6. The method according to claim 1, further comprising overlaying at least one a selected portion of the transferred media or the transferred media over content stored and displayed at the first device.

7. The method according to claim 6, wherein the stored content comprises at least one of video content, an image, a graphic, an object, or a scene stored at the first device.

8. The method according to claim 6, further comprising overlaying the transferred media over a combination of the live video view and the content stored at the first device, and displaying the transferred media overlaid over the combination.

9. The method according to claim 1, the presenting the transferred media over the live video view displayed at the third device further comprises floating the transferred media over the live video view displayed at the third device where the transferred media is not attached to any object in the live video view.

10. The method according to claim 1, the presenting the transferred media over the live video view displayed at the third device further comprising dynamically attaching the transferred media to an object in the live video view.

11. A device for enhancing video telephony comprising:
   a video capture device, the video capture device being capable of capturing a live video view;
   a video telephony module, the video telephony module being capable of receiving transferred media during a video telephone call;
   a processor, the processor being capable of overlaying the transferred media over the live video view and communicating the overlaid transferred media and the live video view to a peripheral device; and a control device in communication with the peripheral device, the control device being capable of receiving user input indicating a location and size of the media overlaid over the live video view.

12. The device according to claim 11, wherein the device comprises a mobile phone.

13. The device according to claim 11, wherein the video capture device comprises a video camera.

14. The device according to claim 11, further comprising a storage device, the storage device containing stored content comprising at least one of video content, an image, a graphic, an object, or a scene.

15. The device according to claim 14, the processor being capable of overlaying the transferred media over the stored content, the display being capable of displaying the transferred media overlaid over the stored content.

16. The device according to claim 14, further comprising the processor being capable of overlaying the transferred media over a combination of the live video view and the content stored at the first device, the display being capable of displaying the transferred media overlaid over the combination.

17. The device according to claim 11, further comprising an interface, the interface capable of providing a connection to an external display device for displaying the transferred media overlaid over the live video view.

18. The device according to claim 11, the processor being capable of overlaying the transferred media over the live video view displayed by floating the transferred media over the live video view where the transferred media is not attached to any object in the live video view.

19. The device according to claim 11, the processor being capable of overlaying the transferred media over the live video view displayed by dynamically attaching the transferred media to an object in the live video view.

* * * * *